US009081800B2

United States Patent
Lin et al.

(10) Patent No.: US 9,081,800 B2
(45) Date of Patent: Jul. 14, 2015

(54) OBJECT DETECTION VIA VISUAL SEARCH

(71) Applicant: Adobe Systems Incorporated, San Jose, CA (US)

(72) Inventors: Zhe Lin, Fremont, CA (US); Jonathan Brandt, Santa Cruz, CA (US); Xiaohui Shen, Evanston (CN)

(73) Assignee: Adobe Systems Incorporated, San Jose, CA (US)

( * ) Notice: Subject to any disclaimer, the term of this patent is extended or adjusted under 35 U.S.C. 154(b) by 170 days.

(21) Appl. No.: 13/781,988

(22) Filed: Mar. 1, 2013

(65) Prior Publication Data

US 2014/0247996 A1 Sep. 4, 2014

(51) Int. Cl.
*G06K 9/62* (2006.01)
*G06F 17/30* (2006.01)
*G06K 9/46* (2006.01)
*G06K 9/00* (2006.01)

(52) U.S. Cl.
CPC ........ *G06F 17/30259* (2013.01); *G06K 9/4676* (2013.01); *G06K 9/6211* (2013.01); *G06K 9/6292* (2013.01); *G06K 9/00228* (2013.01)

(58) Field of Classification Search
CPC .................................................. G06K 9/6202
See application file for complete search history.

(56) References Cited

U.S. PATENT DOCUMENTS

| 5,751,286 | A  | * | 5/1998  | Barber et al. ................. 715/835 |
| 6,526,161 | B1 | * | 2/2003  | Yan ............................... 382/118 |
| 2008/0123901 | A1 | * | 5/2008  | Podilchuk ..................... 382/103 |
| 2008/0187213 | A1 | * | 8/2008  | Zhang et al. .................. 382/159 |
| 2010/0284577 | A1 | * | 11/2010 | Hua et al. ...................... 382/118 |
| 2012/0121193 | A1 | * | 5/2012  | Lipson et al. ................. 382/218 |
| 2012/0163703 | A1 | * | 6/2012  | Lim et al. ...................... 382/154 |

OTHER PUBLICATIONS

Fast and High Performance Template Matching Method, Alexander Sibiryakov, ASL Vision, Lewes, United Kingdom, IEEE 2011, Computer Vision and Pattern Recongition, pp. 1417-1424.*
Non-maximum Suppression Using Fewer than Two Comprarisons per Pexel, Tuan Q. Pham, Canon Information Systems Research Australia, Advanced Concepts for Intelligent Vision Systems, Non-maximum Suppression Using Fewer than Two Comparisons per Pixel, vol. 6474, 2010, pp. 438-451.*

* cited by examiner

*Primary Examiner* — Bernard Krasnic
*Assistant Examiner* — Pinalben Patel
(74) *Attorney, Agent, or Firm* — Kilpatrick Townsend & Stockton LLP

(57) ABSTRACT

One exemplary embodiment involves receiving a test image generating, by a plurality of maps for the test image based on a plurality of object images. Each of the object images comprises an object of a same object type, e.g., each comprising a different face. Each of the plurality of maps is generated to provide information about the similarity of at least a portion of a respective object image to each of a plurality of portions of the test image. The exemplary embodiment further comprises detecting a test image object within the test image based at least in part on the plurality of maps.

20 Claims, 8 Drawing Sheets

OBJECT DETECTION VIA VISUAL SEARCH

FIELD

This disclosure relates generally to computer software and more particularly relates to the creation, modification, use, and distribution of images and similar electronic content.

BACKGROUND

Many conventional approaches to detecting objects in images are based on a sliding window approach. For example, if the object to be detected is a face of an individual, the sliding window approach calls for sliding a rectangle across the image and collecting "face likelihood" information to implement face detection. One of various conventional techniques may be applied to implement the object detection, such as, for example, the Viola-Jones detection framework using the Haar-wavelet technique. These conventional techniques involve training a binary classifier from an image database that consists of both objects and non-objects and then sliding a rectangle across each image in the database to perform the detection and in some instances, varying the scale of the images based on the test image to be detected. Each subimage corresponding to the sliding rectangle is examined by the binary classifier to determine if it is an instance of the object category, e.g., a face.

However, existing use of the sliding window approach can provide poor results in certain circumstances. For example, for face detection, a test image may be a profile view of a face, a slanted view of a face, and/or may otherwise depict an occluded view of a face. The sliding window approach is limited with respect to detecting these types of faces because of the difficulty of learning a good classifier encoding all possible variations.

SUMMARY

One embodiment involves receiving a test image and generating a plurality of maps for the test image based on a plurality of object images. Each of the object images comprises an object and each of the plurality of maps is generated to provide information about the similarity of an object portion of a respective object image to each of a plurality of portions of the test image. The exemplary embodiment further comprises detecting a test image object within the test image based at least in part on the plurality of maps.

Another embodiment involves receiving a test image and generating a plurality of maps for the test image based on a plurality of object images. Each of the object images comprises an object, e.g., each comprising a different face. This embodiment additionally involves gating each one of the plurality of maps using an object-image specific threshold, aggregating the gated maps to generate an aggregate map, selecting maximum modes on the aggregate map, and using the aggregate map information to detect and/or locate a test image object within the test image.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

The file of this patent contains at least one drawing executed in color. Copies of this patent with color drawing(s) will be provided by the Patent and Trademark Office upon request and payment of the necessary fee. These and other features, aspects, and advantages of the present disclosure are better understood when the following Detailed Description is read with reference to the accompanying drawings, where.

DETAILED DESCRIPTION

Figure 4:
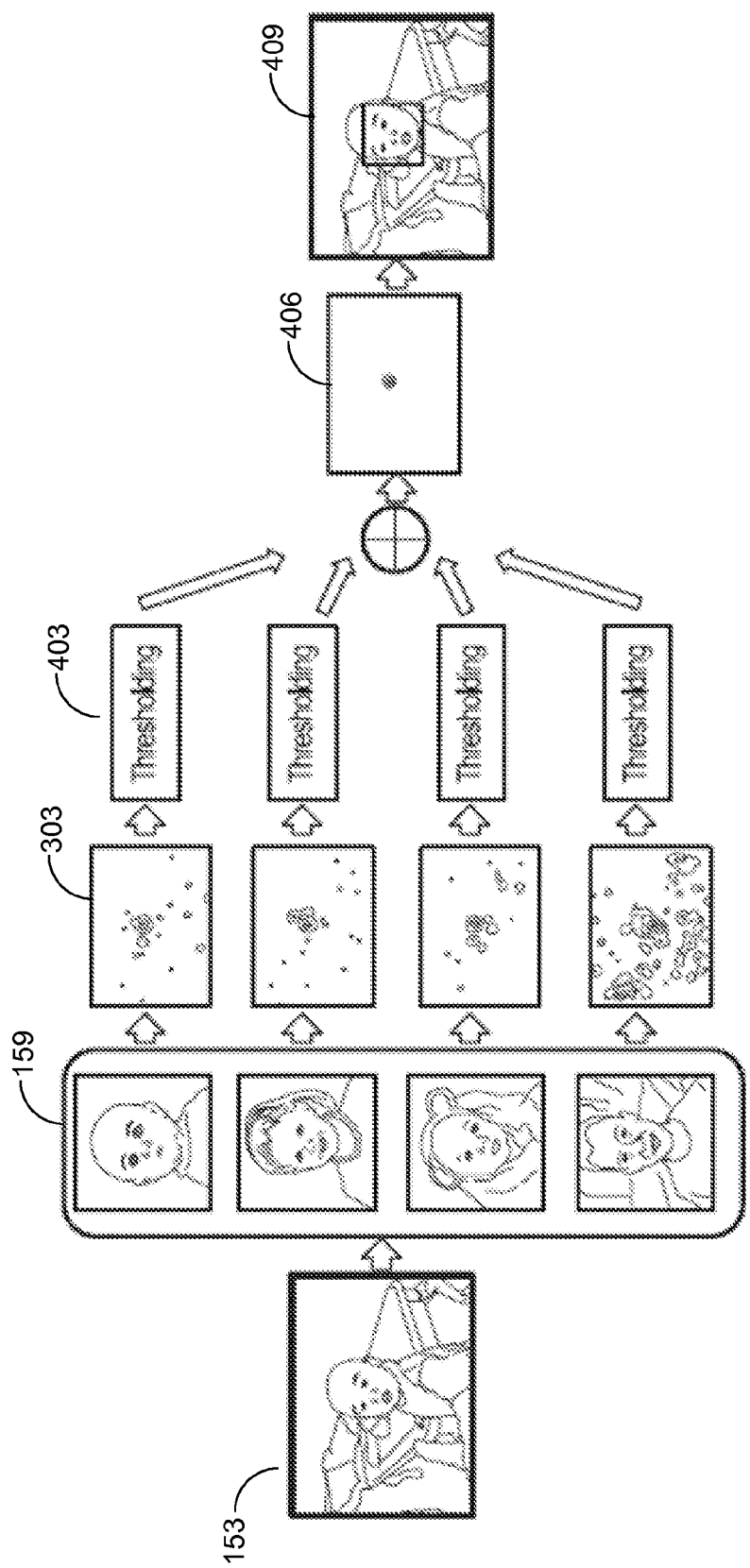
FIG. 4 is an illustration of a pipeline for detecting an object depicted in a test image based on similarity voting maps.

Methods and systems are disclosed for detecting an object in a particular object category (e.g., a face) in an image such as a single photograph. One exemplary embodiment involves receiving a test image and performing one or more computer-implemented techniques to detect and/or identify the location of particular objects within that test image. For example, the techniques may be performed to provide results that display the test image with one or more rectangles around each face detected in the test image. In FIG. 4, for example, a test image 153 is received, the face is detected, and a rectangle is displayed approximately around the detected face. Detecting an object, such as a face, in a test image may involve the use of images that are known to depict objects of that object type. For example, many images of faces (such as the database images 159 of FIG. 4) can be used to detect the presence and location of a face in a test image. In such detection, a test image can be compared with each object image to determine similarities and an aggregate similarity (i.e., an aggregate of the similarities of the test images to each of some or all of those object images) can be used to determine whether an object of the object type (e.g., a face) is depicted within the test image. In other words, if the test image has something that is similar to faces in many of the object images, it can be determined that the test image also depicts a face.

Determining the similarities between the test image and each of the object images can involve determining location-specific similarity information. For example, if an object image comprises a face within a specified rectangular portion, that rectangular portion can be compared with multiple portions of the test image to detect the similarity of each of those different portions to the face. In one example, the location-specific similarity information can provide similarity information about each of appropriately-sized rectangular regions of the test image, identifying that a first portion of the test image is not similar to object image object, that a second portion of the test image is similar, and that a third portion of the test image is even more similar. Similarity can be defined on a numerical scale or in any other appropriate manner.

Thus, a test image may have many appropriately-sized rectangular regions and each such region may be similar to the object image object to a different degree. This information can be represented, stored and/or displayed in the form of a map for each comparison (see e.g., FIG. 4, element 303 illustrating a similarity voting map each determined by comparing the test image with a respective database image) with each position on the map representing the center of a rectangle of the test image and the display attribute (e.g., color) at each position representing the similarity of the associated test image rectangular portion to the object image rectangular portion.

One embodiment involves generating such a map by identifying matching features between a sub-rectangle of an object image and different appropriately-sized rectangles of the test image. The term "feature" refers to information about a portion of an image and, in one exemplary instance, takes the form of spatial information defined by a vector and/or integer. A feature-based comparison may be used to generate a map using a spatially constrained similarity measure as described in U.S. patent application Ser. No. 13/552,595 entitled "Image Retrieval with Spatially-Constrained Similarity Measure and k-NN re-ranking" filed on Jul. 18, 2012 and U.S. patent application Ser. No. 13/624,615 entitled "A Technique to Mobile Product Image Search by Automatic Query Object Localization and Segmentation Application" filed on Sep. 21, 2012 which are hereby incorporated by reference. A feature-based similarity voting map, generated by such techniques, is a type of map that provides information about the similarity of a test image to another image where the similarity is determined based on feature matching and voting techniques.

However generated, a map comprising similarity information can be used in detecting the presence of an object of the particular object type in the test image. Thus, in one embodiment, an object, such as a face, is detected in a test image by generating a single map using a single image of an object of the object type and determining that the test image depicts an object of the object type based on that similarity or that it does not depict an object of that object type based on the lack of similarity. For example, a test image can be compared with a single image of a face to determine that the test image also comprises an image of a face.

The reliability of detecting an object of an object type in a test image can, however, be improved by using multiple object images. Multiple maps can be generated based on each of many test image-to-object image comparisons and resulting maps aggregated to provide aggregated information about the similarity of the test image overall to those object images (See e.g. element 406 in FIG. 4). The aggregate map provides information about the similarity of the test image to many images of object of the same object type. For example, an aggregate similarity map may provide information on the similarity of different portions of the test image to many images of faces. Use of an aggregate map (as opposed to a map from a single object image) in object detection can improve the accurate detection of the presence and/or location of objects of the object type. An aggregate map may be generated for each of multiple, different scales.

Detection of the objects from the aggregate map can involve identifying maximum modes with non-maxima suppression. For instance, a detected repository image that is a true depiction of the object in the test image will exhibit a relatively high similarity score around a center of the object. In one embodiment, maximum mode involves selecting a maximum value within a neighborhood and non-maxima suppression involves suppressing the similarity scores close to the neighborhood of the selected maximum node. Thus, the values that surround the selected maximum node are suppressed as they are not local maxima. Having suppressed the non-maxima, the remaining maximum modes of the aggregated similarity voting map indicate the locations of the detected objects, e.g., of the faces. In the example of a map that represents center of object rectangle locations, the remaining nodes represent the locations of the centers of rectangles for the detected faces.

The embodiments disclosed may improve detection results, for example, identifying occluded faces as faces and reducing false positive results, for example, instances where non-faces are identified as faces. The embodiments disclosed herein may also provide addition advantages through the use of new visual search algorithms and/or discriminative classifier training techniques. Strong object classifiers can be learned and/or used to detect object instances with different variations, e.g., different faces and challenging views of faces. Objects in a test image can be efficiently localized with voting-based techniques to potentially avoid or limit the use of more exhaustive search techniques, such as the sliding window technique. The embodiments described herein provide for a more accurate analysis of localizing objects in images with rare poses such as a profile pose or a rotated orientation of the object compared with the sliding window approach. The object in the test image with the rare pose cannot be detected reliably with the sliding window approach due to its model-based nature where one or more than one independent classifiers are trained for a variety of different poses. Additionally, the object in the test image can be localized in a faster time than the sliding window approach. For instance, the similarity voting map generated as described above can be used to localize the object in the test image instead of relying on the time consuming and costly process of evaluating a binary classifier trained offline at every image location and scale as required in the sliding window approach.

These illustrative examples are given to introduce the reader to the general subject matter discussed here and are not intended to limit the scope of the disclosed concepts. The following sections describe various additional embodiments and examples with reference to the drawings in which like numerals indicate like elements.

Figure 1:
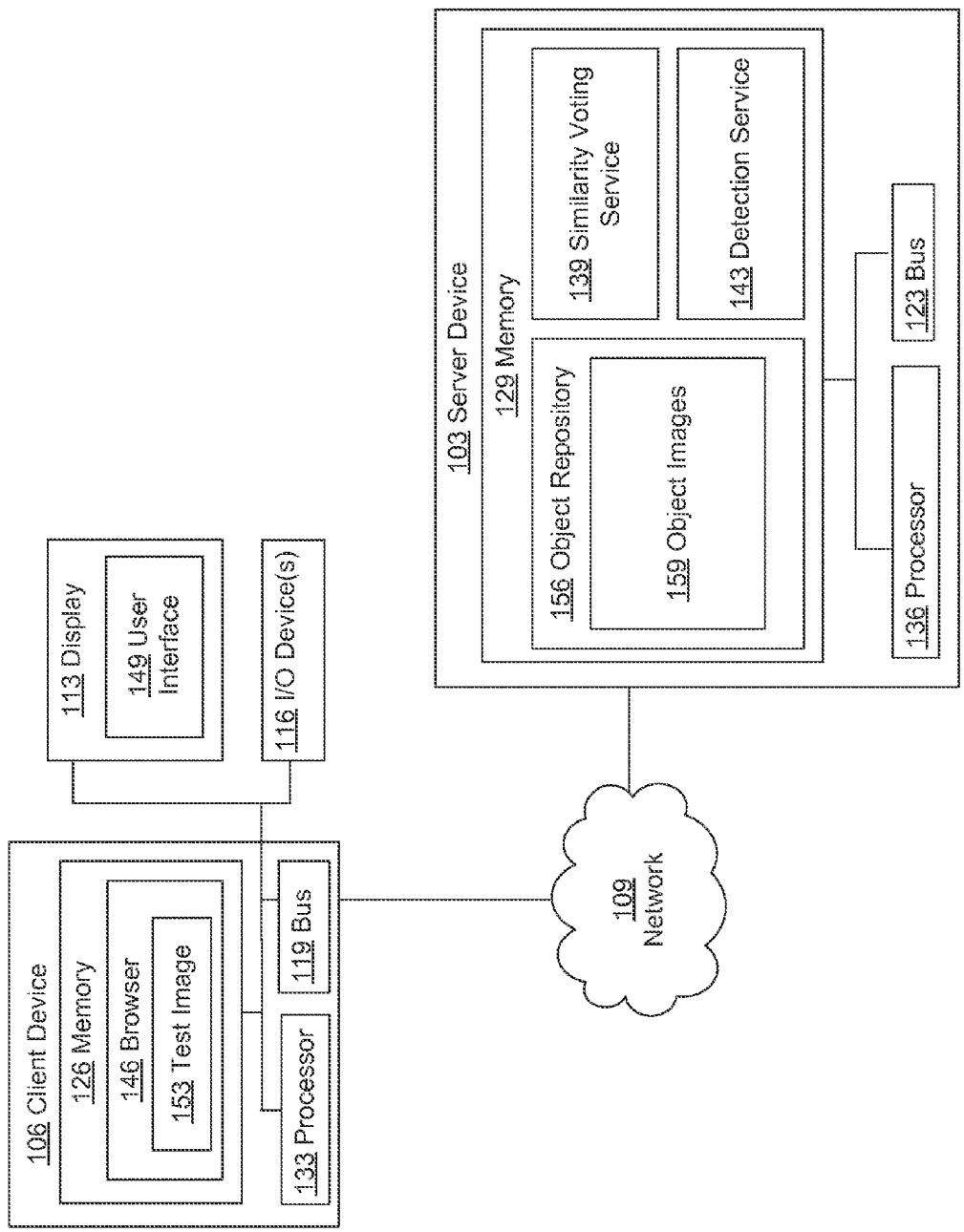
FIG. 1 is a block diagram depicting exemplary computing devices in an exemplary computing environment for implementing certain embodiments.

FIG. 1 depicts an exemplary computing environment for detecting objects depicted in a test image based at least in part on similarity voting maps generated on the test image for a collection of object images stored in a data store. The methods and systems disclosed herein are also applicable on other computing systems and environments. The environment shown in FIG. 1 includes a wired or wireless network 109 connecting various devices 103 and 106. In one embodiment, the network 109 includes the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 103 and 106 are respectively used as special purpose computing devices to provide specific functionality offered by their respective applications and by the interaction between their applications. As an example, client device 106 is shown with a display 113 and various input/output devices 116. A bus, such as bus 119 and bus 123, will typically be included in a device as well.

As used herein, the term "application" refers to any program instructions or other functional components that execute on a device. An application may reside in the memory of a device that executes the application. As is known to one of skill in the art, such applications may be resident in any suitable computer-readable medium and execute on any suitable processor. For example, as shown the devices 103 and 106 each have a computer-readable medium such as memory 126 and 129 coupled to a processor 133 and 136 that executes computer-executable program instructions and/or accesses stored information. Such processors 133 and 136 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

As used herein, the term "server" refers to an application that listens for or otherwise waits for requests or a device that provides one or more such applications that listens for or otherwise waits for requests. Server device 103 is an example of a server. A "server device" may be used to perform the searching of items based on a received search criteria from the user. For example, the server device 103 may include a similarity voting service 139 and a detection service 143.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

In FIG. 1, client device 106 includes a memory 126 that includes browser 146. In one embodiment, the browser 146 may be a browser that renders a user interface 149 on the display 113 associated with the client device 106. The browser 146 may be executed to transmit a request to the server device 103 for detecting objects depicted in a test image 153. For example, a user on the client device 106 may request to detect one or objects depicted in a test image 153 by manipulating the user interface 149 rendered on the display 113. The browser 146 may then transmit the request to the detection service 143 and in response, receive an indication of the detected object. In one embodiment, upon receiving the indication of the detected object, the browser 146 may render the indication of the detected object on the display 113.

The server device 103 includes a memory 129 that includes the similarity voting service 139, the detection service 143, an object repository 156, and/or other components. The object repository 156 includes a collection of object images 159. For example, the object images 159 may depict faces of individuals and the test image 153 may depict a face of one more of individuals. The detection service 143 receives the test image 153 and invokes the similarity voting service 139 to generate a similarity voting map for the test image 153 based on each object image 159 included in the object repository 156. The detection service 143 then modifies each of the similarity voting maps to attempt to eliminate false positive results. For example, this may involve gating each similarity voting map using a similarity threshold. The gated maps are aggregated to provide an aggregate similarity voting map.

Having generated the aggregate similarity voting map, the detection service then can apply a technique to identify the most representative score or scores within an aggregate similarity voting map. For example, an aggregate map may have a similarity score of 10 that is in a neighborhood surrounded by other nearby high scores in the same neighborhood that all reflect a similarity of a face to the corresponding portions of the test image represented by those scores. High scores in portions of the test image that are further away (i.e. outside of the neighborhood) may correspond to a different face but high scores that are near one another (i.e. within the neighborhood) can be treated as corresponding to a single object. Accordingly, a technique can be applied to select the best score or scores. In one embodiment, this involves the use of a maximum mode and non-maxima suppression of the aggregate similarity voting map. The resulting aggregated similarity voting map then reflects the location of the object in the test image. For example, a sub-rectangle can be determined from the similarity voting map where the highest similarity represents a center of the sub-rectangle of the test image thereby localizing the object in the test image.

In one embodiment, a user on the client device 106 transmits the request to detect the object depicted in the test image 153 by manipulating one or more user interfaces 149 rendered on the display 113 via one or more I/O devices 116, such as a keyboard and/or a mouse. The detection service 143 receives the request and invokes the similarity voting service 139 to generate a similarity voting map of the test image 153 based on each one of the object images 159 in the object repository 156, as described in U.S. patent application Ser. No. 13/552, 595 entitled "Image Retrieval with Spatially-Constrained Similarity Measure and k-NN re-ranking" filed on Jul. 18, 2012 and U.S. patent application Ser. No. 13/624,615 entitled "A Technique to Mobile Product Image Search by Automatic Query Object Localization and Segmentation Application" filed on Sep. 21, 2012 which are hereby incorporated by reference in its entirety.

To this end, the similarity voting service 139 evaluates a similarity between the test image 153 and each one of the object images 159 in the object repository 156. A sub-rectangle indicating a location of the object in the object image 159 may have been previously identified. The similarity voting service 139 evaluates the content of the sub-rectangle with the object depicted in the test image 153, such as the features within the sub-rectangle. For instance, spatial information of each object image 159 may be represented by a sub-rectangle $B=\{x_c, y_c, w, h, \theta\}$ where $(x_c, y_c)$ is the coordinate of the rectangle center, w and h are the width and height of the rectangle respectively, and $\theta$ is the rotated angle of the rectangle. The similarity voting service 139 determines whether the test image 159 has similar features as the features of the sub-rectangle in the object image 159. For example, the sub-rectangle in the test image 153 may be represented as $B'=\{x_c+x_t, y_c+y_t, s\cdot w, s\cdot h, \theta=\alpha\}$. The similarity voting service 139 determines the sub-rectangle in the test image 153 based on each object image 159 and generates a voting similarity map based on the similarity of features between the sub-rectangle of the test image 153 and the sub-rectangle of each object image 159. For example, the similarity may be represented by a numerical floating value such as 0.5, 10.8, 100.4 and the like. In one embodiment, the similarity voting service 139 may calculate the relative locations of features within the object image 159 with respect to the center and compare the calculated locations with the corresponding locations within the test image 153 to determine if the feature at the corresponding location in the test image 153 matches the feature of the object image 159.

Next, the similarity voting service 139 generates a similarity voting map between the test image 153 and each object image 159. For example, the similarity voting service 139 identifies a matching feature between the test image 153 and the object image 159 and determines a location of a rectangle center. The similarity voting service 139 then maps a voting score for the determined location. For instance, if the matching feature pairs are spatially consistent, then the corresponding center locations should be similar. The similarity voting service 139 generates a voting score for a complete set of matching pairs of elements between the test image 153 and the object image 159 and generates a voting map based on the cumulative voting scores of all of the matched features.

The detection service 143 then determines which ones of the similarity voting scores generated by the similarity voting service 139 is within a similarity threshold. To this end, the detection service 143 implements a "gating" approach to determine which portions of the similarity voting maps are within the similarity threshold for each object image 159. For example, the detection service 143 subtracts the similarity threshold from each similarity voting map and sets any negative values to zero. Each object image 159 in the object repository 156 may be associated with a similarity threshold. For instance, the similarity threshold may be based at least in part on an empirical estimation that an object depicted in the test image 153 is similar to the object depicted in the object image 159. In one embodiment, the similarity threshold represents the maximum similarity score between the object image 159 and any possible portion (for example, a non-face portion) of any test image 153 which can be determined based on past results through a training process. In the case of face detection, subtracting the similarity threshold from the similarity voting maps reduces the chances of non-face portions of the test image 153 being positively detected as faces. The detection service 143 implements the gating by subtracting the similarity threshold value from each similarity voting map thereby reducing all of the similarity scores represented by the similarity voting map. Any negative scores are replaced with a zero as the negative scores correspond with non-face portions of the test image 153 that would yield a false positive. The remaining similarity scores in the similarity voting map may then be used in the aggregation, as will be described.

Each object image 159 is associated with a similarity threshold. In one embodiment, the similarity threshold may be discriminatively learned. For example, a collection of negative training sets may be collected defined as N. Each object image 159 in the object repository 156 is defined as $c_i$ and the similarity threshold for the respective object image 153 is defined as $t_i$. In solving for $t_i$. The similarity threshold for each object image 159 can be defined as:

$$t_i = \max_{j \in N} s_i(x_j)$$

where $s_i(x)$ is the similarity score between the object image 159 and a test image 153 and N represents a negative training set.

The detection service 143 then aggregates all of the similarity voting maps after similarity voting maps have been gated using the similarity threshold. In one embodiment, the aggregation is defined as follows:

$$S(x) = \sum_{i: s_i(x) > t_i} (s_i(x) - t_i)$$

where S(x) is the final similarity score for the test image 153, $s_i(x)$ is the similarity score between the test image 153 and the object image 159, and t is the corresponding similarity threshold. The aggregation of the similarity voting maps is implemented after the gating to remove any similarity voting maps of object images 159 that are unlikely to depict the object in the test image 153. Thus, the similarity voting maps that are associated with a similarity score that is less than the similarity threshold are treated as providing no information about the object depicted in the test image 153. Excluding similarity voting maps associated with a similarity score that is less than the similarity threshold in the aggregation of the similarity voting maps will result in a higher confidence in the aggregation. After aggregating the similarity voting maps that are within the similarity threshold, the detection service 143 then selects the maximum nodes from the maps with non-maxima suppression to get the final detection results, as known in the art. Non-maximum suppression is known in the art to be a local maximum search where a local maximum is greater than the value of its surrounding neighbors. For example, the high similarity portion of the aggregated similarity voting map may be the center of the sub-rectangle that defines the bounds of the object in the test image 153.

Figure 2:
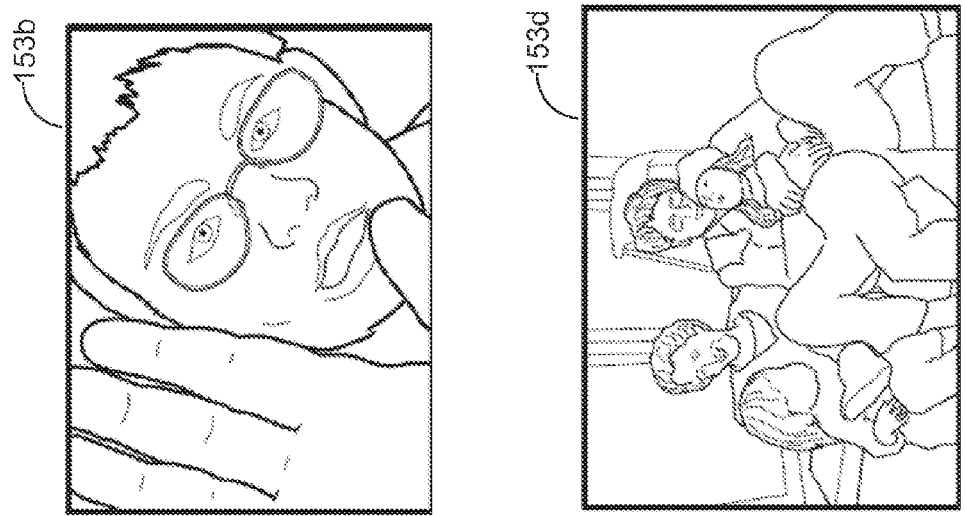
FIG. 2 is an illustration of images for detecting objects depicted in the images that may result in poor results using the sliding window approach.
Figure 2:
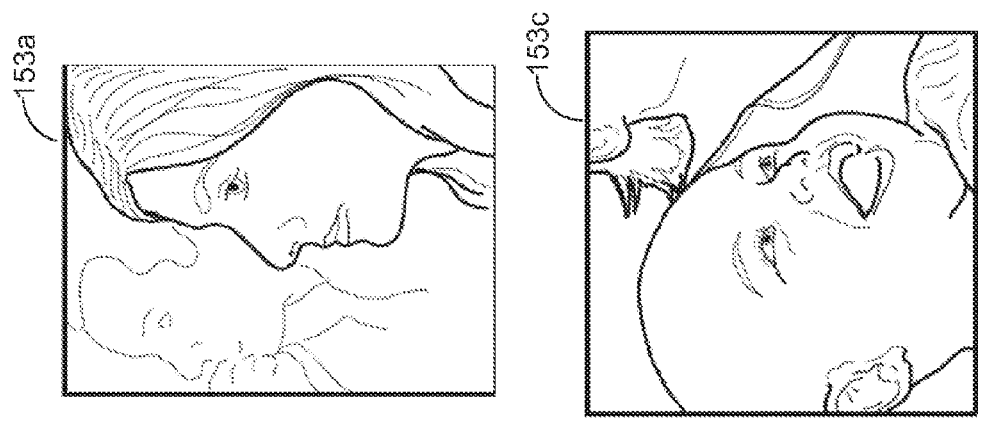

FIG. 2 depicts a plurality of test images 153 with challenging views. For example, test image 153a depicts a face with a profile view that only shows a portion of the features of a face. Test image 153b depicts a face partially occluded that skews the view of the features of a face. For instance, a hand casts a shadow across the face, blocks a portion of the face and alters the overall focus of the image to create a challenging image for detection. Test image 153c depicts a large face with an angled view that shows only a portion of the features of the face and test image 153d shows multiple faces at varying angles where some of the faces are partially occluded. The test images 153 represent challenging views for image detection using conventional approaches such as the sliding window approach.

Figure 3:
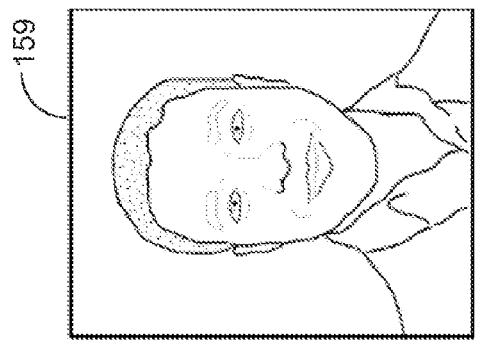
FIG. 3 is an illustration of a similarity voting map defining the similarity between a test image and exemplar image.
Figure 3:
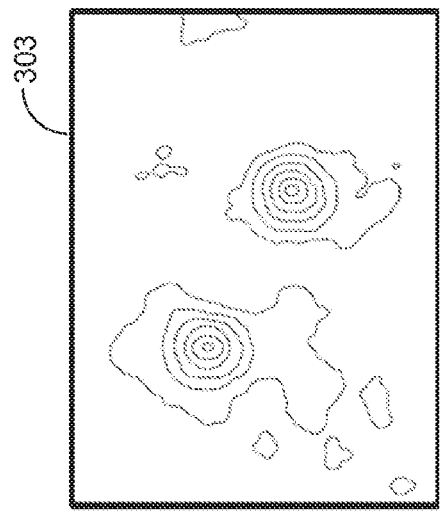
Figure 3:
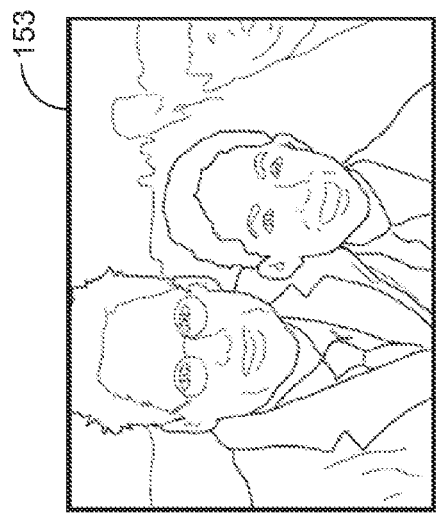

FIG. 3 depicts a test image 153, an object image 159 and a similarity voting map 303. In one embodiment, a user on the client device 106 may provide the test image 153 for image detection by manipulating a user interface 149 (FIG. 1) using one or more I/O device 116 (FIG. 1) associated with the client device 106. In this example, the test image 153 includes a plurality of faces for detection and includes two faces. In one embodiment, the detection service 143 (FIG. 1) receives the request to detect the objects (i.e., faces) in the test image 153 and invokes the similarity voting service 139 (FIG. 1) to generate a plurality of similarity voting map 303 for the test image 153 based on each of the object images 159 (FIG. 1) of the object repository 156 (FIG. 1). In this example, the object image 159 represents an exemplar image from the object repository 156 and the similarity voting map 303 represents the similarity between the test image 153 and the object image 159.

The similarity voting service 139 generates the similarity voting map 303 based on a similarity score between a sub-rectangle in the test image 153 and a sub-rectangle in the object image 159. In one embodiment, the similarity score may be defined as follows:

$$S(x, c_i) = \sum_{k=1}^{N} \sum_{\substack{(f_i, s_j) \\ f_i \in x, g_j \in c_i \\ w(f_i) = w(g_j) = k \\ \|T(L(f_i)) - L(g_j)\| < s}} \frac{idf^2(k)}{tf_x(k) \cdot tf_{c_i}(k)}$$

where x is the test sample (i.e., a sub-rectangle in the test image 153), and $c_i$ is the i-th object image 159 in the object repository 156. $f_i$ are the local features extracted from the test sample x, and $g_j$ are the local features extracted from the ci object image 159. k denotes the k-th visual word in a learned vocabulary. For instance, a visual word corresponds to a cluster of extracted features of an image and the vocabulary corresponds to all of the clusters of the image. . idf(k) is the inverse document frequency of k, $tf_x(k)$ and $tf_{c_i}(k)$ are the term frequencies (i.e., number of occurrences) of k in x and $c_i$ respectively. $L(f)=(x_f, y_f)$ is the 2D image location of f. The spatial constraint $\|T(L(f_i))-L(g_j)\|<\epsilon$ means that the locations of the two matched features should be sufficiently close under certain transformations. In one embodiment, this similarity score may be calculated by on multiple scales.

The similarity voting service 139 generates the similarity voting map 303 based on the similarity scores for matching features between portions of the test image 153 and the sub-rectangle of the object image 159 as described above. In FIG. 3, the matching features of the faces in the test image 153 and the object image 159 are determined for a sub-rectangle and mapped, where dense concentric shapes indicates a high similarity score and other areas with sparse or no concentric shapes indicates a low similarity score. In this example, the portion of the test image 153 involving the young boy ranked higher in similarity score than the portion of the test image 153 involving the older man. Therefore, the portion of the similarity voting map involving the young boy depicts a larger amount of concentric shapes than the portion of the similarity voting map involving the older man in the test image 153.

FIG. 4 illustrates a pipeline for image detection using the embodiments described herein. Included in FIG. 4 is an example of a test image 153, a set of object images 159 from the object repository 156 (FIG. 1), a set of similarity voting maps 303 depicting the similarity scores on a voting map between the test image 153 and the respective object image 159, thresholding 403, an aggregate similarity voting map 406, and a detected image 409. As discussed above, the detection service 143 receives the test image 153 to detect the object (i.e., face) depicted in the test image 153. In response, the detection service 143 invokes the similarity voting service 139 to generate the similarity voting maps 303 for each one of the object images 159 of the object repository 156 based on the test image 153. For example, the similarity voting service 139 generates a similarity voting map 303 between the test image 153 and each object image 159 by scoring the similarity of matching features between portions of the test image 153 and a sub-rectangle of the object image 159, as discussed above. Therefore, the similarity voting service 139 generates a similarity voting map 303 for each object image 159 in the object repository 156.

Next, the detection service 143 implements thresholding to determine whether each of the similarity voting maps 303 is within a similarity threshold. In one embodiment, the detection service 143 determines whether a similarity voting map 303 is associated with a similarity score that is within a similarity threshold for the corresponding object image 159. Upon determining which similarity voting maps 303 are equal to or greater than the similarity threshold, the detection service 143 aggregates the similarity voting maps 303 that are equal to or greater than the similarity threshold to generate an aggregate similarity voting map 406. In one embodiment, aggregating the similarity voting maps 406 may be defined as follows:

$$S(x) = \sum_{i: s_i(x) > t_i} (s_i(x) - t_i)$$

where S(x) is the final similarity detection score of x which is the test image 153, $s_i(x)$ is the similarity score between the test image 153 x and the object image 159 $c_i$, and $t_i$ is the corresponding similarity threshold. Upon generating the aggregated voting map 406, the detection service 143 selects the detected image 409 by selecting the maximum modes from the aggregated voting map 406 with non-maxima suppression.

Figure 5:
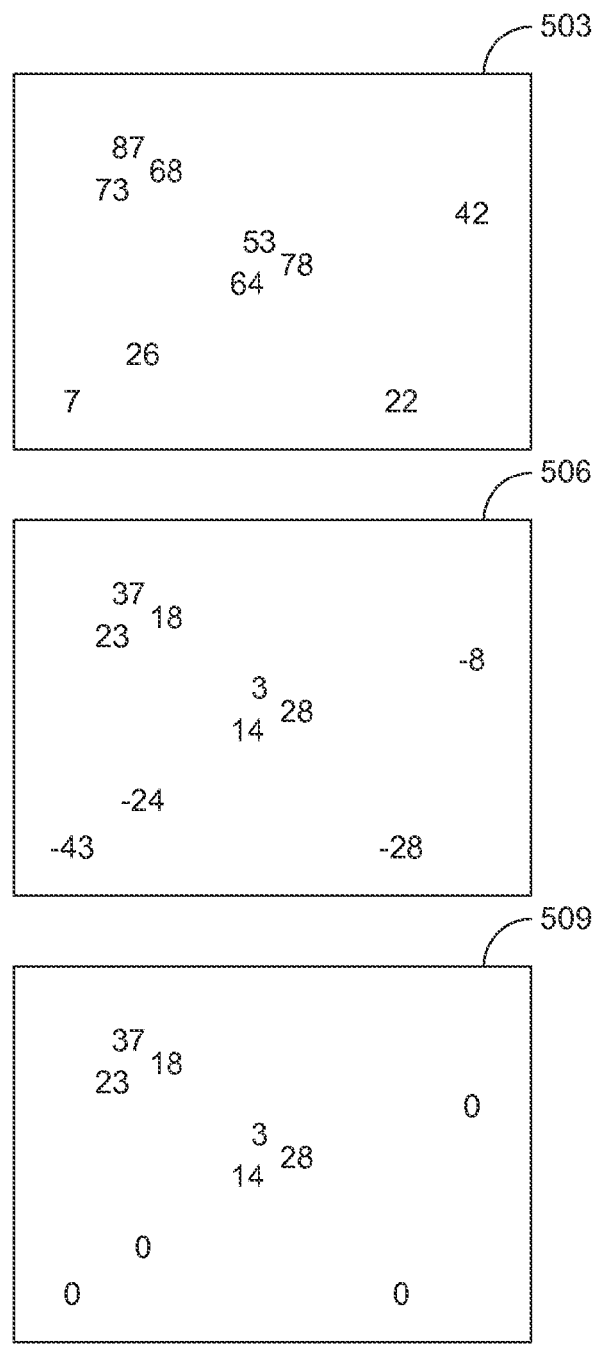
FIG. 5 is an illustration of gating a similarity voting map based on a similarity threshold associated with the object image used to generate the similarity voting map.

FIG. 5 is all an illustration of gating implemented on the similarity voting maps using a similarity threshold. The similarity voting map depicts a similarity between one of an object images and a test image. As shown in FIG. 5, three similarity voting maps 503, 506 and 509 are depicted. A similarity voting map is comprised of one or more similarity scores that are generated as discussed above. For example, the similarity voting service 139 (FIG. 1) generates a similarity scores at different locations. In this embodiment, the similarity scores are represented as numerical values in map 503.

To implement gating, the detection service 143 identifies the similarity threshold for the object image used to generate the similarity voting map 503 and subtracts the similarity scores represented in the similarity voting map 503 with the similarity threshold. For example, the similarity threshold for an object image may be 50. The detection service 143 subtracts each one of the similarity scores by 50 as shown in map 506. In one embodiment, the similarity threshold represents the maximum value of a false positive result using that object image in the past. Any similarity scores below the similarity threshold are likely to be non-object portions of the test image 153 and thus can be disregarded for purposes of object detection.

Subtracting the similarity threshold from the similarity scores may produce negative similarity scores. For example, if the similarity score is not high enough, then the resulting value after the subtraction will be a negative value. The negative similarity scores can be considered to not provide useful information about the possible location of the object in the test image and thus may be disregarded. As such, in the gating process, such negative scores can be zeroed as shown in map 509 so that these values do not adversely affect the aggregation step.

Figure 6:
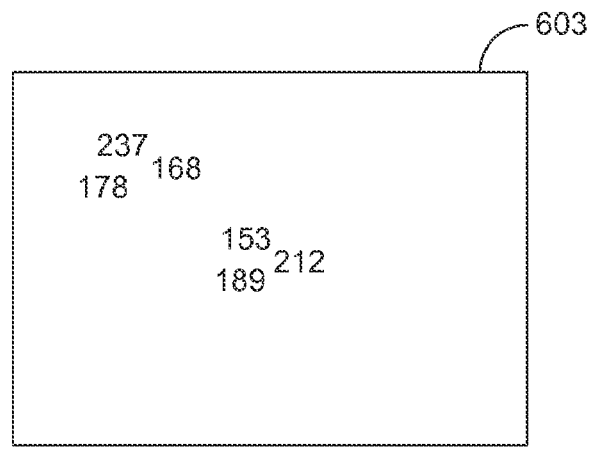
FIG. 6 is an illustration of selecting maximum modes and implementing non-maxima suppression.
Figure 6:
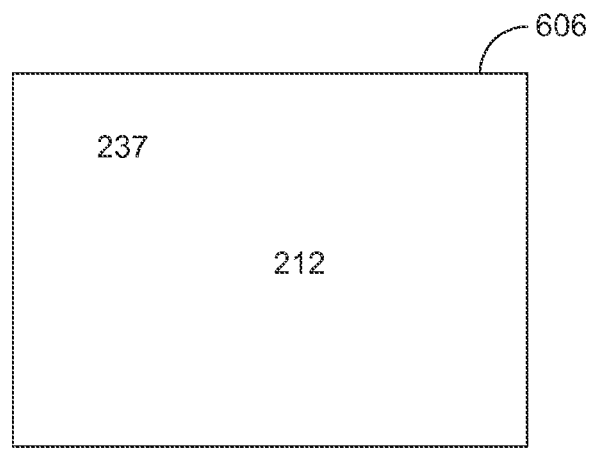

FIG. 6 is an illustration of selecting maximum modes and implementing non-maxima suppression. Shown in FIG. 6 are two similarity voting maps 603 and 606. In one embodiment, map 603 represents an aggregated similarity voting map where the detection service 143 (FIG. 1) has implemented gating on each similarity voting map generated by the similarity voting service 139 (FIG. 1) and aggregated all the gated similarity voting maps. Map 603 includes two neighborhoods of similarity scores that have been aggregated from all of the similarity voting maps generated by the similarity voting service 139. In one embodiment, each neighborhood may correspond to one object depicted in the test image 153. For example, the test image 153 may depict two faces as shown in FIG. 3.

The detection service 143 selects maximum modes in each neighborhood and implements non-maxima suppression of the other nodes in the neighborhood to determine the center of the object depicted in the test image. For example, the first neighborhood of similarity scores may correspond to features of a first object depicted in the test image 153 and the second neighborhood of similarity scores may correspond to features of a second object depicted in the test image 153. The detection service 143 identifies the maximum similarity score in each neighborhood and suppresses the non-local maxima in the neighborhood. Thus, as shown in map 606, the remaining scores are 237 of the first neighborhood and 212 of the second neighborhood. The remaining maximum modes of the neighborhoods each represent the center of an object depicted in the test image 153.

Figure 7:
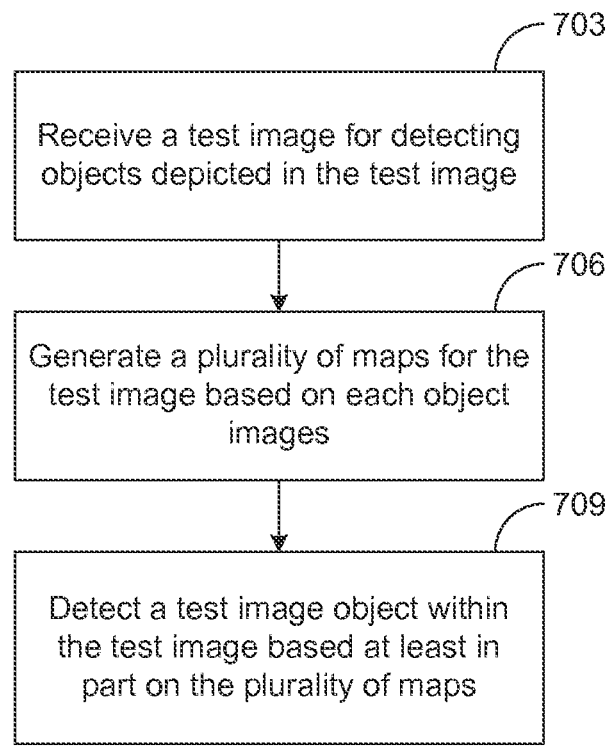
FIG. 7 is a flow chart illustrating an exemplary method of a detection service for detecting an object depicted in a test image based on similarity voting maps and similarity thresholds.

FIG. 7 is a flowchart that provides one example of the operation of a portion of the detection service 143 (FIG. 1) according to certain embodiments. It is understood that the flowchart of FIG. 7 provides merely an example of the many different types of functional arrangements that may be employed to implement the operation of the portion of the detection service 143 as described herein. As an alternative, the flowchart of FIG. 7 may be viewed as depicting an example of steps of a method implemented in the computing device 103 (FIG. 1) according to one or more embodiments.

Beginning at step 703, the detection service 143 receives a test image 153 for detecting one or more objects depicted in the test image. For example, a user on a client device 106 (FIG. 1) may provide the test image 153 for detection via a user interface 149 (FIG. 1). In step 706, the detection service 143 invokes the similarity voting service 139 to generate a plurality of maps depicting the similarity between the test image 153 and each one of a plurality of object images 159. In one embodiment, the similarity voting service 139 generates the maps based at least in part on similarity scores determined from matching features between the test image 153 and the object image 159.

Then, in step 709, the detection service 143 detects a test image object within the test image 153 based at least in part on the plurality of maps. In one embodiment, the detection service 143 gates each one of the maps based on the similarity threshold associated with the corresponding object image 159 used to generate the map. To this end, the detection service 143 subtracts the similarity threshold from the similarity scores represented in each map and zeros any resulting negative values to generate a gated map. The detection service 143 then aggregates the gated maps to generate an aggregate map. For example, the detection service 143 adds all of the similarity scores from the gated maps to generate the aggregate map. Having aggregated the gated maps, the detection service 143 then selects the maximum modes in a neighborhood of similarity scores and suppresses the non-maxima nodes of the neighborhood. The resulting aggregated map indicates the location of the objects depicted in the test image 153. For instance, the maximum modes represent the center of one of the objects depicted in the test image 153.

Figure 8:
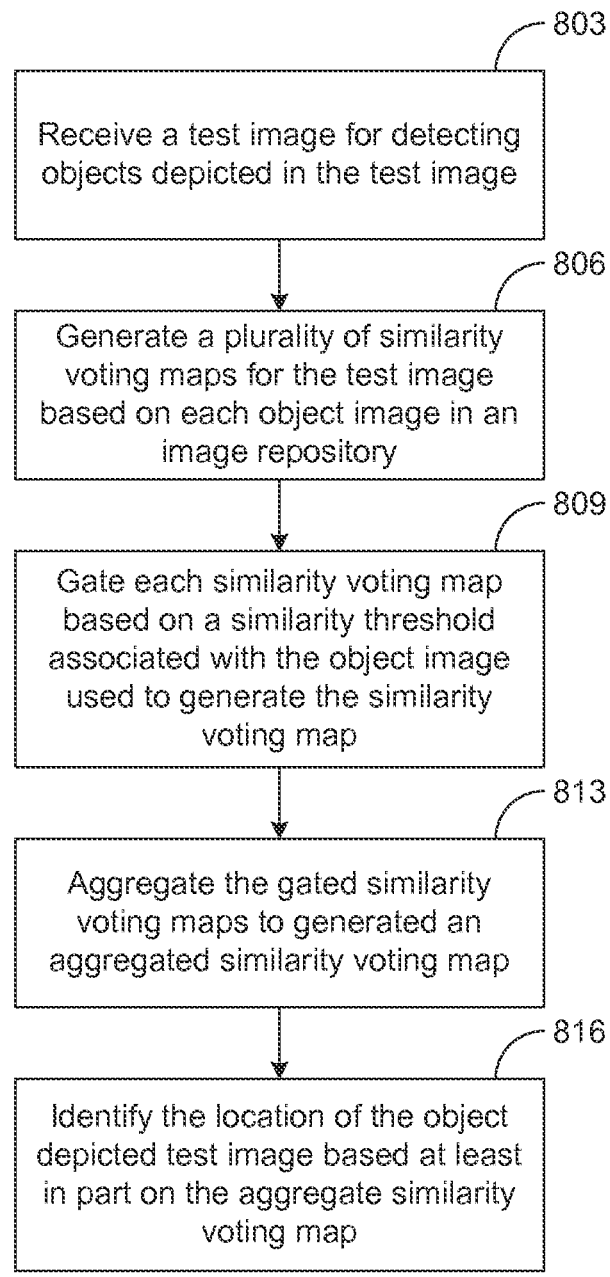
FIG. 8 is a flowchart illustrating another exemplary method of a detection service for detecting an object depicted in a test image.

FIG. 8 is a flowchart that provides one example of the operation of a portion of the detection service 143 (FIG. 1) according to certain embodiments. It is understood that the flowchart of FIG. 8 provides merely an example of the many different types of functional arrangements that may be employed to implement the operation of the portion of the detection service 143 as described herein. As an alternative, the flowchart of FIG. 8 may be viewed as depicting an example of steps of a method implemented in the computing device 103 (FIG. 1) according to one or more embodiments.

Beginning at step 803, the detection service 143 receives a test image 153 (FIG. 1) for detecting objects depicted in the test image 153. In one embodiment, a user on a client device 106 (FIG. 1) may manipulate a user interface 149 via one or more I/O devices 116 (FIG. 1) to transmit a request to the detection service 143 to detect the object in the test image 153. For example, the test image may be a photograph and the object may be a face of an individual.

In step 806, the detection service 143 invokes the similarity voting service 139 to generate a plurality of similarity voting maps for the test image 153 based on each one of the object images 159 (FIG. 1) in an object repository 156 (FIG. 1). In one embodiment, the similarity voting service 139 generates the similarity voting map by identifying matching features between a sub-rectangle of the object image 159 and portions of the test image 153. The similarity voting service 139 then determines the similarity between the matching features in the two images and generates the similarity voting map.

Next, in step 809, the detection service 143 implements gating on each similarity voting map based on a similarity threshold associated with the respective object image 159 used to generate each similarity voting map. In one embodiment, the detection service 143 identifies the similarity threshold for each object image 159 and subtracts the similarity threshold from the similarity scores represented in the similarity voting map generated from that object image 159. Any negative values resulting from the subtraction are zeroed and thus disregarded. These values provide no information as to the location of the object depicted in the test image 153. The remaining values (all positive values) represent a similarity that exceeds the minimum necessary to be similar to object in the object image 159, i.e., a face.

Next, in step 813, the detection service 143 aggregates the similarity voting maps after they have been modified via gating to generate an aggregated similarity voting map. In one embodiment, the aggregated similarity voting includes aggregated similarity scores of all of the gated similarity voting maps. Upon generating the aggregate similarity voting map, in step 816 the detection service 143 identifies the location of the object depicted in the test image 153 based at least in part on the aggregate similarity voting map. For example, the highest similarity as shown in the similarity voting map may represent the center of the object depicted in the test image 153. In one embodiment, local maximum nodes of the aggregate similarity voting map may be identified and their corresponding non-maxima may be suppressed to reduce the likelihood of falsely identifying the location.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
    receiving, at a computing device comprising a processor, a test image;
    generating, by the processor, a plurality of maps for the test image based on a plurality of object images, each of the plurality of maps generated to provide information about a similarity of an object portion of a respective object image to each of a plurality of portions of the test image;
    gating each of the plurality of maps to generate a plurality of gated maps, wherein gating each map comprises subtracting an object-image-specific similarity threshold from each similarity score represented in the map and removing negative results to produce a gated map;
    aggregating the plurality of gated maps to generate an aggregate map; and
    using the aggregate map to detect a test image object within the test image.

2. The computer-implemented method of claim 1, wherein using the aggregate map to detect the test image object comprises determining a location of the test image object within the test image based at least in part on the aggregate map.

3. The computer-implemented method of claim 1 wherein using the aggregate map to detect the test image object comprises
    detecting the test image object based at least in part on a maximum mode with non-maxima suppression of the aggregate map.

4. The computer-implemented method of claim 1, wherein the object portion of the respective object image is a rectangular portion of the respective object image that was identified by a manual selection as comprising an object depicted in the object image.

5. The computer-implemented method of claim 1, wherein each of the maps is generated by determining a similarity score between rectangles of the test image and an object rectangle in the respective object image.

6. The computer-implemented method of claim 1, wherein each of the maps is generated using features in a respective object image to vote against the test image at a certain scale, wherein a value at each location corresponds to a similarity score between a rectangle of the test image and an object rectangle in the respective object image.

7. The computer-implemented method of claim 1, wherein each of the maps is generated by:
    identifying feature matches, each feature match comprising a match between a feature in the test image and a feature in the object portion of the respective object image; and
    generating a respective map based on the feature matches.

8. The computer-implemented method of claim 1, wherein each of the maps is generated by:
    identifying feature matches, each feature match comprising a match between a feature in the test image and a feature in the object portion of the respective object image; and
    using a similarity voting technique to generate the respective map based on the feature matches.

9. The computer-implemented method of claim 1, wherein each of the plurality of maps depict an object of the same object type.

10. The computer-implemented method of claim 1, wherein each of the plurality of maps depict a face.

11. The computer-implemented method of claim 1, wherein the test image depicts an occluded view of a first face and the object images depict occluded and non-occluded views of multiple and different exemplar faces.

12. A system comprising:
    a processor for executing instructions stored in computer-readable medium on one or more devices, the instructions comprising one or more modules configured to perform the steps comprising:
receiving a test image;
generating a plurality of maps for the test image based on a plurality of object images;
gating each one of the plurality of maps to generate the respective map, wherein gating each one of the plurality of maps comprises subtracting an object-image-specific similarity threshold from each similarity score represented in the map and removing negative results to produce a gated map;
aggregating the plurality of gated maps to generate an aggregate map; and
using the aggregate map to detect a test image object within the test image.

13. The system of claim 12, wherein each of the plurality of maps is generated using features in a respective object image to vote against the test image at a certain scale, wherein a value at each location corresponds to a similarity score between a sub-rectangle of test image and an object rectangle in the respective object image.

14. The system of claim 12, wherein the test image object is detected by determining a location of the test image object within the test image based at least in part the aggregate map.

15. The system of claim 12, wherein using the aggregate map to detect the test image object comprises detecting the test image object based at least in part on a maximum mode with non-maxima suppression of the aggregate map.

16. A computer-implemented method comprising:
receiving, at a computing device comprising a processor, a test image;
generating, by the processor, a plurality of maps for the test image based on a plurality of object images, each of the plurality of object images comprising an object of a same object type; and
gating each of the plurality of maps to generate a plurality of gated maps, wherein gating each map comprises subtracting an object-image-specific similarity threshold from each similarity score represented in the map and removing negative results to produce a gated map;
aggregating the plurality of gated maps to generate an aggregate map; and
detecting a test image object of the same object type within the test image based at least in part on the aggregate map.

17. The computer-implemented method of claim 16 wherein detecting the test image object comprises
detecting the test image object based at least in part on a maximum mode with non-maxima suppression of the aggregate map.

18. The computer-implemented method of claim 16, wherein each of the maps is generated using features in a respective object image to vote against the test image at a certain scale, wherein a value at each location corresponds to a similarity score between a sub-rectangle of test image and an object rectangle in the respective object image.

19. The computer-implemented method of claim 16, wherein the test image depicts an occluded view of a first face and the object images depict occluded and non-occluded views of multiple and different exemplar faces.

20. The computer-implemented method of claim 16, wherein each of the maps is generated by:
identifying feature matches, each feature match comprising a match between a feature in the test image and a feature in the object portion of the respective object image; and
generating a respective map based on the feature matches.

* * * * *